(12) United States Patent
DeLuca et al.

(10) Patent No.: US 10,778,694 B2
(45) Date of Patent: Sep. 15, 2020

(54) LOCATION DETECTION BASED PRESENTATION

(71) Applicant: INTERNATIONAL BUSINESS MACHINES CORPORATION, Armonk, NY (US)

(72) Inventors: Lisa Seacat DeLuca, Baltimore, MD (US); Jeremy A. Greenberger, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 16/115,613

(22) Filed: Aug. 29, 2018

(65) Prior Publication Data
US 2020/0076822 A1 Mar. 5, 2020

(51) Int. Cl.
*G06F 21/36* (2013.01)
*H04L 29/06* (2006.01)
*H04W 12/06* (2009.01)
*G06F 16/27* (2019.01)

(52) U.S. Cl.
CPC ............ *H04L 63/107* (2013.01); *G06F 16/27* (2019.01); *H04L 63/083* (2013.01); *H04W 12/06* (2013.01)

(58) Field of Classification Search
CPC ..... H04L 63/107; H04L 63/083; H04L 63/08; G06F 21/316; G06F 21/36; G06F 2221/2103; G06F 2221/2115; G06F 2221/2117; G06F 2221/2133; G06Q 30/02
See application file for complete search history.

(56) References Cited

U.S. PATENT DOCUMENTS

| 8,910,251 | B2 | 12/2014 | Shepard |
| 8,959,621 | B2* | 2/2015 | Snelling ................ G06F 21/316 |
| | | | 726/19 |
| 9,147,065 | B2 | 9/2015 | Lauer |
| 2009/0012855 | A1 | 1/2009 | Jamal |
| 2009/0210937 | A1 | 8/2009 | Kraft |

(Continued)

OTHER PUBLICATIONS

Aggarwal, Suhas; Animated CAPTCHAs and games for advertising; Companion Proceedings of the 22nd International Conference on World Wide Web; May 13-17, 2013; pp. 1167-1174.

(Continued)

*Primary Examiner* — Olugbenga O Idowu
(74) *Attorney, Agent, or Firm* — Schmeiser, Olsen & Watts; Stephanie Carusillo

(57) ABSTRACT

A method and system for improving location detection and presentation is provided. The method includes receiving a request for access to a secure Website and retrieving an automated challenge response test for determining that a user is a living being. A location of the user is detected and analyzed with respect to images of the automated challenge response test. Local entities associated with the images are determined and correct images and incorrect images are identified for executing the automated challenge response test. First actions for enabling the user to execute functions associated with the correct images with respect to the local entities are added to the correct images. Second actions for enabling the user to execute functions associated with the incorrect images with respect to the local entities are added to the correct images and a resulting modified automated challenge response test is presented to the user.

20 Claims, 6 Drawing Sheets

(56) References Cited

U.S. PATENT DOCUMENTS

2009/0249477 A1 10/2009 Punera
2013/0091027 A1 4/2013 Lin
2015/0170204 A1* 6/2015 Inbar .................... G06Q 30/02
705/14.55

OTHER PUBLICATIONS

Chand, Ashootosh; Method and System for Offering an Advertisement as a CAPTCHA challenge; IP.com Disclosure No. IPCOM000206568D; Apr. 29, 2011; 8 pages.
Hillen, Florian et al; Geo-reCAPTCHA: Crowdsourcing large amounts of geographic information from earth observation data; International Journal of Applied Earth Observation and Geoinformation 40 (2015); pp. 29-38.

* cited by examiner

LOCATION DETECTION BASED PRESENTATION

FIELD

The present invention relates generally to a method for detecting a user location for presentation and in particular to a method and associated system for improving hardware and software based graphical user interface (GUI) technology associated with associated with presenting location based information for improving an efficiency with respect to hardware device communications.

BACKGROUND

Accurately enabling interface presentations between devices typically includes an inaccurate process with little flexibility. Determining presentation solutions with respect to Web based information may include a complicated process that may be time consuming and require a large amount of resources. Accordingly, there exists a need in the art to overcome at least some of the deficiencies and limitations described herein above.

SUMMARY

A first aspect of the invention provides a location detection and presentation improvement method comprising: receiving from a user of a hardware device, by a processor of a server device, a request for access to a secure Website; retrieving, by the processor in response to the request, an automated challenge response test for determining that the user is a living being; detecting, by the processor via a sensor device of the hardware device, a location of the user; analyzing, by the processor, the location with respect to images of the automated challenge response test; determining, by the processor based on results of the analyzing, local entities associated with the images; identifying, by the processor, correct images and incorrect images of the images for executing the automated challenge response test; first adding, by the processor to the correct images, first actions for enabling the user to execute functions associated with the correct images with respect to the local entities; second adding, by the processor to the incorrect images, and second actions for enabling the user to execute functions associated with the incorrect images actions with respect to the local entities, wherein the first adding in combination with the second adding results in generating a modified automated challenge response test associated with the automated challenge response test; and presenting to the user, by the processor, the modified automated challenge response test.

A second aspect of the invention provides a computer program product, comprising a computer readable hardware storage device storing a computer readable program code, the computer readable program code comprising an algorithm that when executed by a processor of a server device implements a location detection and presentation improvement method, the method comprising: receiving from a user of a hardware device, by the processor, a request for access to a secure Website; retrieving, by the processor in response to the request, an automated challenge response test for determining that the user is a living being; detecting, by the processor via a sensor device of the hardware device, a location of the user; analyzing, by the processor, the location with respect to images of the automated challenge response test; determining, by the processor based on results of the analyzing, local entities associated with the images; identifying, by the processor, correct images and incorrect images of the images for executing the automated challenge response test; first adding, by the processor to the correct images, first actions for enabling the user to execute functions associated with the correct images with respect to the local entities; second adding, by the processor to the incorrect images, and second actions for enabling the user to execute functions associated with the incorrect images actions with respect to the local entities, wherein the first adding in combination with the second adding results in generating a modified automated challenge response test associated with the automated challenge response test; and presenting to the user, by the processor, the modified automated challenge response test.

A third aspect of the invention provides a server hardware device comprising a processor coupled to a computer-readable memory unit, the memory unit comprising instructions that when executed by the computer processor implements a location detection and presentation improvement method comprising: receiving from a user of a hardware device, by the processor, a request for access to a secure Website; retrieving, by the processor in response to the request, an automated challenge response test for determining that the user is a living being; detecting, by the processor via a sensor device of the hardware device, a location of the user; analyzing, by the processor, the location with respect to images of the automated challenge response test; determining, by the processor based on results of the analyzing, local entities associated with the images; identifying, by the processor, correct images and incorrect images of the images for executing the automated challenge response test; first adding, by the processor to the correct images, first actions for enabling the user to execute functions associated with the correct images with respect to the local entities; second adding, by the processor to the incorrect images, and second actions for enabling the user to execute functions associated with the incorrect images actions with respect to the local entities, wherein the first adding in combination with the second adding results in generating a modified automated challenge response test associated with the automated challenge response test; and presenting to the user, by the processor, the modified automated challenge response test.

The present invention advantageously provides a simple method and associated system capable of enabling interface presentations between devices.

DETAILED DESCRIPTION

Figure 1:
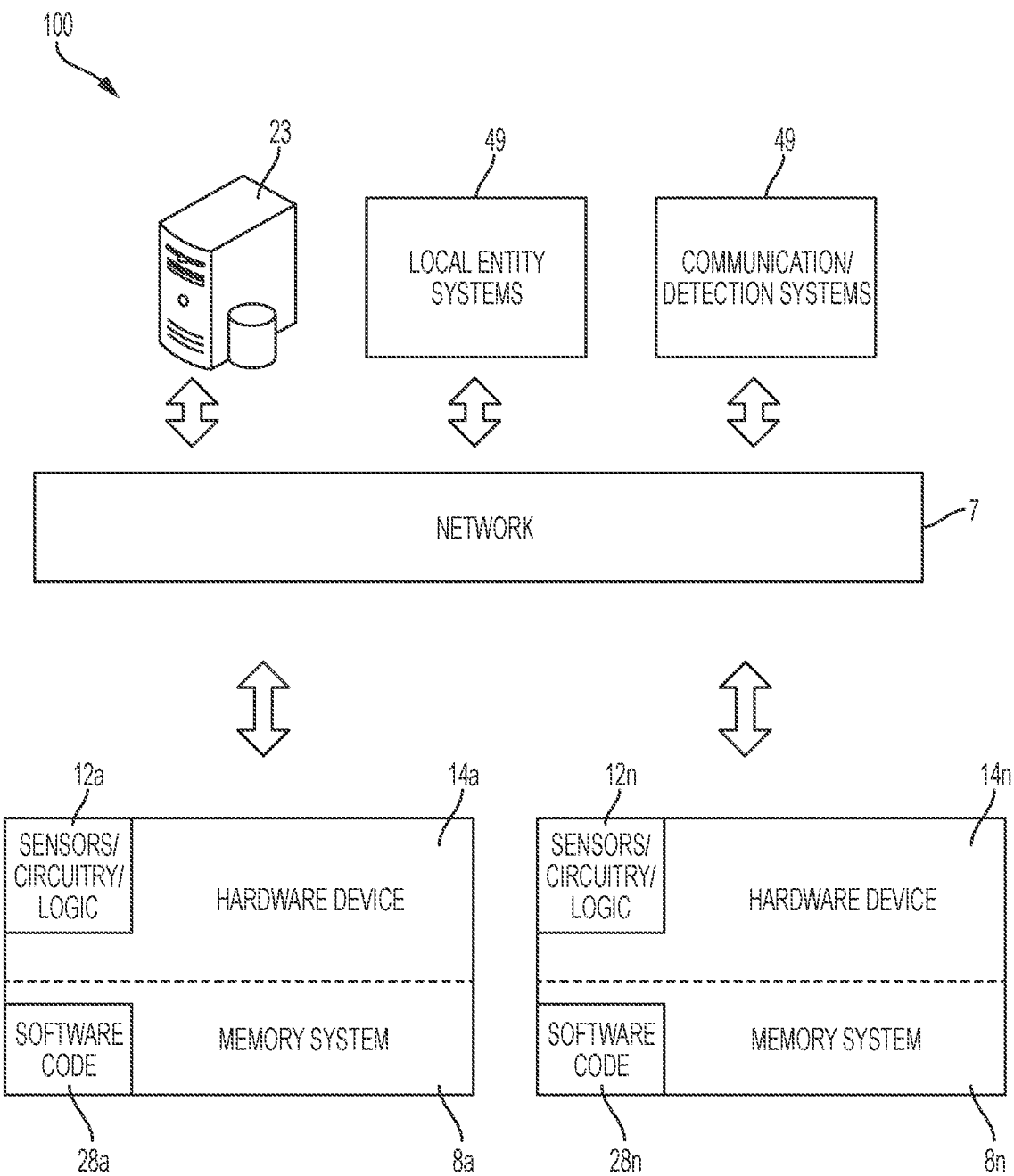
FIG. 1 illustrates a system for improving hardware and software based graphical user interface (GUI) technology associated with presenting location based information for improving an efficiency with respect to hardware device communications, in accordance with embodiments of the present invention.

FIG. 1 illustrates a system 100 for improving hardware and software based graphical user interface (GUI) technology associated with presenting location based information for improving an efficiency with respect to hardware device communications, in accordance with embodiments of the present invention. System 100 is enabled to increase location awareness via identification of local entities within a GUI. System 100 enables the following functionality for authenticating a user and presenting location based information via an automated challenge response test such as a completely automated public turing test to tell computers and humans apart (CAPTCHA) test:

In response to a Website access request, a location of a user is determined and a list of images with respect to points of interest located within a threshold distance from the user are accessed based on the determined location. A first group of images comprising a characteristic associated with the user is selected from the images. Likewise, a second group of images that do not comprise the characteristic associated with the user is selected from the images. In response, a CAPTCHA is generated. The CAPTCHA includes the first group of images and the second group of images. The CAPTCHA is presented to the user such that the user is instructed to identify images (in the CAPTCHA) associated with the characteristic. The CAPTCHA provides a verification process for allowing to access the Web site. A GUI is enabled for displaying an object providing additional information to the user with respect to one or more points of interest included in the CAPTCHA. In response to a selection of the object responsive to selection of the object in the GUI, a Webpage associated with the one or more points of interest is presented to the user.

System 100 of FIG. 1 includes a notification server hardware device (or hardware system) 23, local entity systems 49, and communication detection systems 49 connected through a network 7 to (mobile) hardware devices 14a . . . 14n. Hardware device 14a comprises sensors/circuitry/logic 12a and a (specialized) memory system 8a. Memory system 8a comprises software code 28a. Memory system 8a may include a single memory system. Alternatively, memory system 8a may include a plurality of memory systems. Mobile hardware device 14n comprises sensors/circuitry/logic 12n and a (specialized) memory system 8n. Memory system 8n comprises software code 28n. Memory system 8n may include a single memory system. Alternatively, memory system 8n may include a plurality of memory systems. Server hardware device 23, local entity systems 49, communication detection systems 49, and hardware devices 14a . . . 14n each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server hardware device 23, local entity systems 49, communication detection systems 49, and hardware devices 14a . . . 14n may each comprise a specialized hardware device comprising specialized (non-generic) hardware and circuitry (i.e., specialized discrete non-generic analog, digital, and logic based circuitry) for (independently or in combination) executing a process described with respect to FIGS. 1-6. The specialized discrete non-generic analog, digital, and logic based circuitry (e.g., sensors/circuitry/logic 12a . . . 12n, etc.) may include proprietary specially designed components (e.g., a specialized integrated circuit, such as for example an Application Specific Integrated Circuit (ASIC) designed for only implementing an automated process for improving hardware and software based graphical user interface (GUI) technology associated with presenting location based information for improving an efficiency with respect to hardware device communications. Sensors/circuitry/logic 12 may include any type of internal or external sensors including, inter alia, GPS sensors, Bluetooth beaconing sensors, cellular telephone detection sensors, Wi-Fi positioning detection sensors, triangulation detection sensors, activity tracking sensors, social network code based sensors, a heart rate monitor, a blood pressure monitor, a temperature sensor, a pulse rate monitor, an ultrasonic sensor, an optical sensor, a video retrieval device, humidity sensors, voltage sensors, network traffic sensors, etc. Network 7 may include any type of network including, inter alia, a local area network, (LAN), a wide area network (WAN), the Internet, a wireless network, etc.

System 100 enables the following process for presenting location based information within a CAPTCHA test presentation:

The process is initiated when a user enables a Web process (via a hardware system) for navigating to a secure Website or Web form. In response, the Website (associated with the secure form) presents (to the user via a device such as a mobile device) a CAPTCHA test for retrieving CAPTCHA related input from the user to determine if the user is a living being (i.e., human). Additionally, the system determines a location of the device of the user. The location may be determined via, inter alia, GPS sensors, Bluetooth beacon positioning sensors, cellular sensors, triangulation sensors, etc. The system further analyzes the location and determines nearby locations associated with a specified entity type. For example, the system may determine local pizzerias nearby the location of the user (e.g., based on recent locations visited by the user). Entities be required to enter their location and pay a fee for the opportunity to be presented in CAPTCHA options as described, infra. For example, out of a X possible options in a CAPTCHA presentation form, the system identifies a top Y number of locations (e.g., for pizzerias) to be associated with a possible "correct answer" image (where Y<=X). In response, the system identifies a different type of location (e.g., amusement parks) in order to fill in "incorrect answer" images within the CAPTCHA presentation form. The correct and incorrect answer entities presented in the CAPTCHA form may optionally include an actionable activation means (e.g., a GUI button) for allowing the user to interact with the entities. For example, with respect to the pizzeria embodiment, an actionable activation means may include, inter alia, a button/switch for booking a reservation, browsing a menu, ordering takeout, placing an order for delivery, etc. In response to a user selection, the system provides the user with a combination of options via the CAPTCHA presentation form and presents a request for the user to select images belonging to an identified topic. In response the user inputs his/her answer and the system verifies that the user has selected all of the possible options for correctness using CAPTCHA processing techniques. If the user has selected the correct answers, the system verifies that the user is "human".

Figure 2:
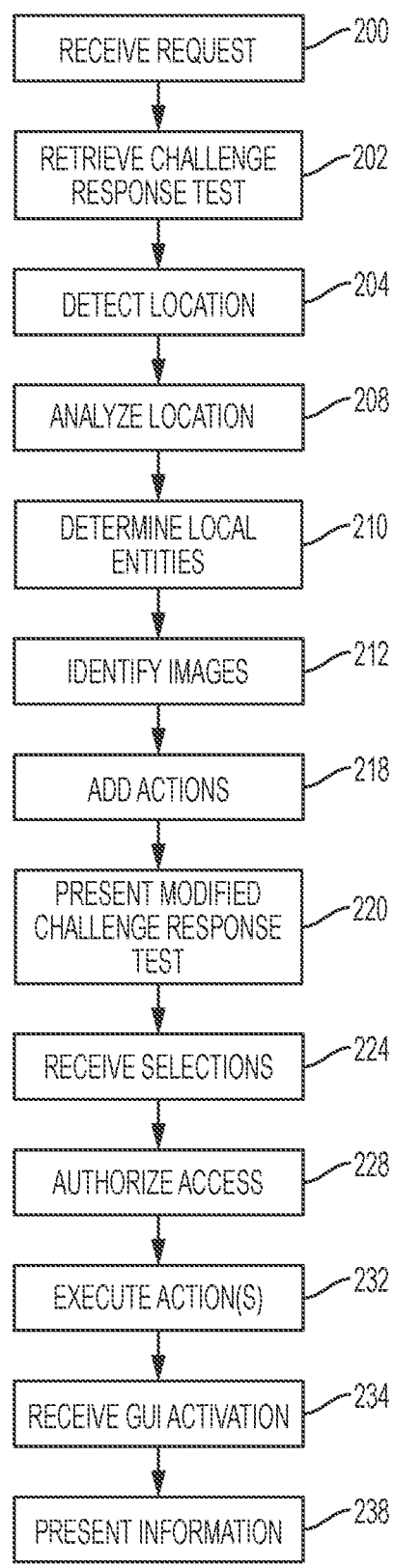
FIG. 2 illustrates an algorithm detailing a process flow enabled by the system of FIG. 1 for improving hardware and software based GUI technology associated with presenting location based information for improving an efficiency with respect to hardware device communications, in accordance with embodiments of the present invention.

FIG. 2 illustrates an algorithm detailing a process flow enabled by system 100 of FIG. 1 for improving hardware and software based graphical user interface (GUI) technology associated with presenting location based information for improving an efficiency with respect to hardware device communications, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server hardware device 23, local entity systems 49, communication detection systems 49, and hardware devices 14a . . . 14n of FIG. 1. In step 200, a request for access to a secure Website is received (by a server) from a user of a hardware device. In step 202, an automated challenge response test (e.g., a CAPTCHA test) for determining that the user is a living being is retrieved. In step 204, a location of the user is detected via a sensor device (e.g., a global positioning satellite (GPS) device, a Bluetooth beaconing device, a cellular telephone detection device, a Wi-Fi positioning detection device, a triangulation detection device, etc.) of the hardware device. In step 208, the location is analyzed with respect to images of the automated challenge response test. In step 210, local entities associated with the images are determined based on results of the analysis of step 208 and geographical locations associated with recent visits by the user. The local entities may be determined by: querying a database comprising multiple entities associated with multiple subjects and geographical locations; and selecting the local entities from the database based on results of the querying. In step 212, correct images and incorrect images of the images are identified for executing the automated challenge response test. In step 218, first actions are added to the correct images. The first actions are configured for enabling the user to execute functions associated with the correct images with respect to the local entities. Additionally, second actions are added to the incorrect images. The second actions are configured for enabling the user to execute functions associated with the incorrect images. The actions may include GUI activation means for interacting with first entities of the local entities and second entities of the local entities. Adding the first actions and the second actions to the images results in a process for generating a modified automated challenge response test associated with the automated challenge response test. In step 220, the modified automated challenge response test is presented to the user. In step 224, a first selection for at least one action of the first or second actions is received from the user. Additionally, a second selection of a group of the images is received from the user. In step 228, the user is authorized for access to the secure Website in response to the first and second selections. In step 232, the at least one action is executed in response to the authorization of step 228. In step 234, a GUI activation experience is received in response to the authorization of step 228. In step 238, information associated with the local entities is presented to the user for selecting entity based functions (e.g., restaurant reservations).

Figure 3:
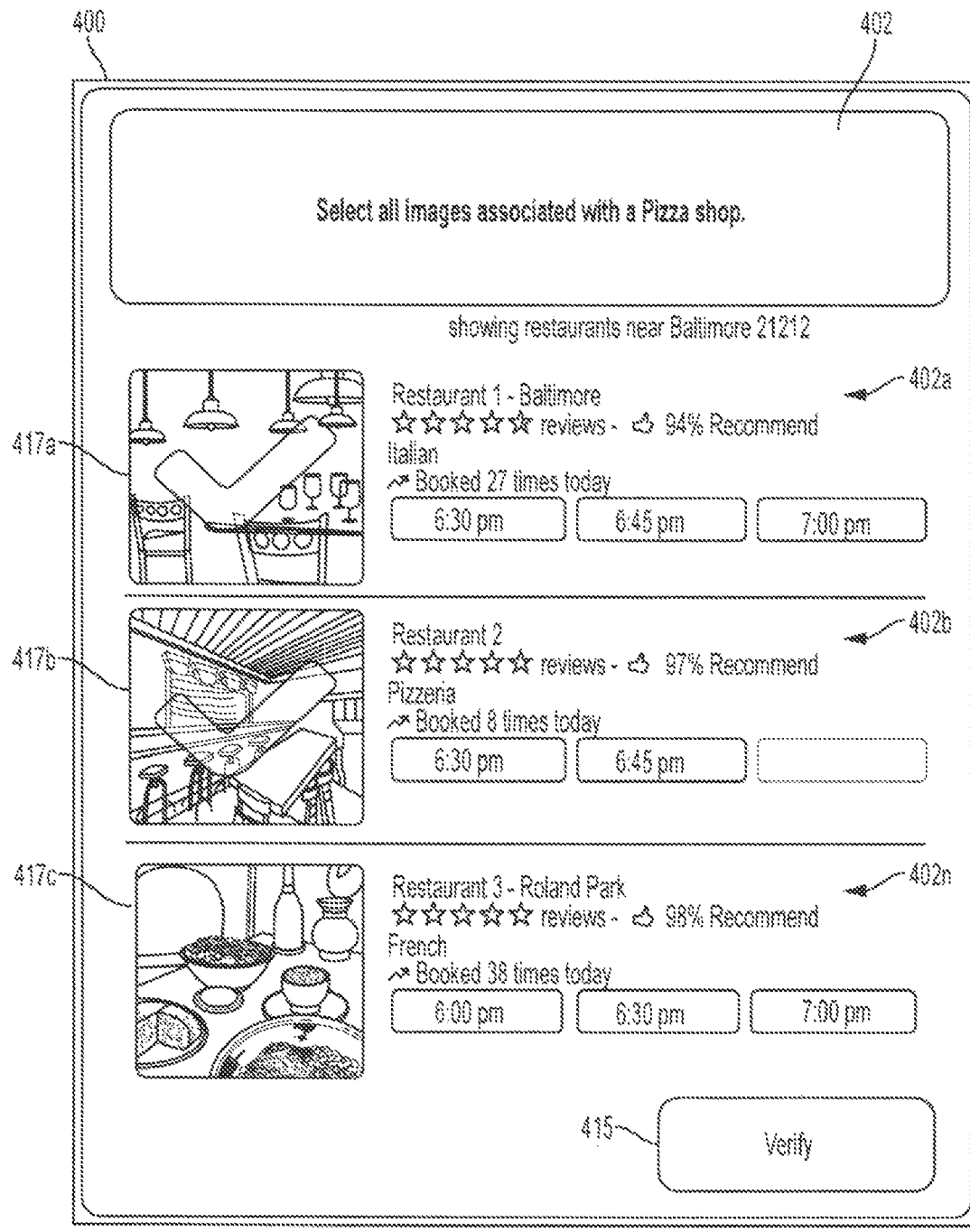
FIG. 3 illustrates an implementation example enabling the system of FIG. 1 for improving hardware and software based GUI technology associated with presenting location based information associated with restaurants for improving an efficiency with respect to hardware device communications, in accordance with embodiments of the present invention.

FIG. 3 illustrates an implementation example enabling system 100 of FIG. 1 for improving hardware and software based graphical user interface (GUI) technology associated with presenting location based information associated with restaurants for improving an efficiency with respect to hardware device communications, in accordance with embodiments of the present invention. The example illustrated in FIG. 3 illustrates a GUI 400 comprising an instruction portion 402, reservation selection portions 402a . . . 402n associated with CAPTCHA images 417a . . . 417n, and a verification action execution means 415. GUI 400 allows the CAPTCHA images 417a . . . 417n to be personalized for a user. For example, GUI 400 may only present images and associated restaurants or stores that the user has previously visited for presentation of specified user preferred products for enabling the user to become a repeat customer. For example, a user A is presented with a CAPTCHA varication test and his/her Web browser determines that he/she is located in Baltimore, Md. Therefore, the CAPTCHA verification test determines and retrieves possible advertisements to present to the user A within the CAPTCHA verification test. The user A is presented with GUI 400. In response, the CAPTCHA verification test requests that user A select (via images 417a . . . 417n) restaurants that serve pizza. Additionally, CAPTCHA verification test presents reservation selection portions 402a . . . 402n illustrating that there are tables available tonight at the restaurants presented in images 417a . . . 417n. Therefore, the user A selects a specified time slot (via reservation selection portions 402a . . . 402n) thereby booking a table for the associated restaurant at the specified timeslot. Additionally, user A enables the action execution means 415 to verify the reservation and proceeds to complete the CAPTCHA verification test.

Figure 4:
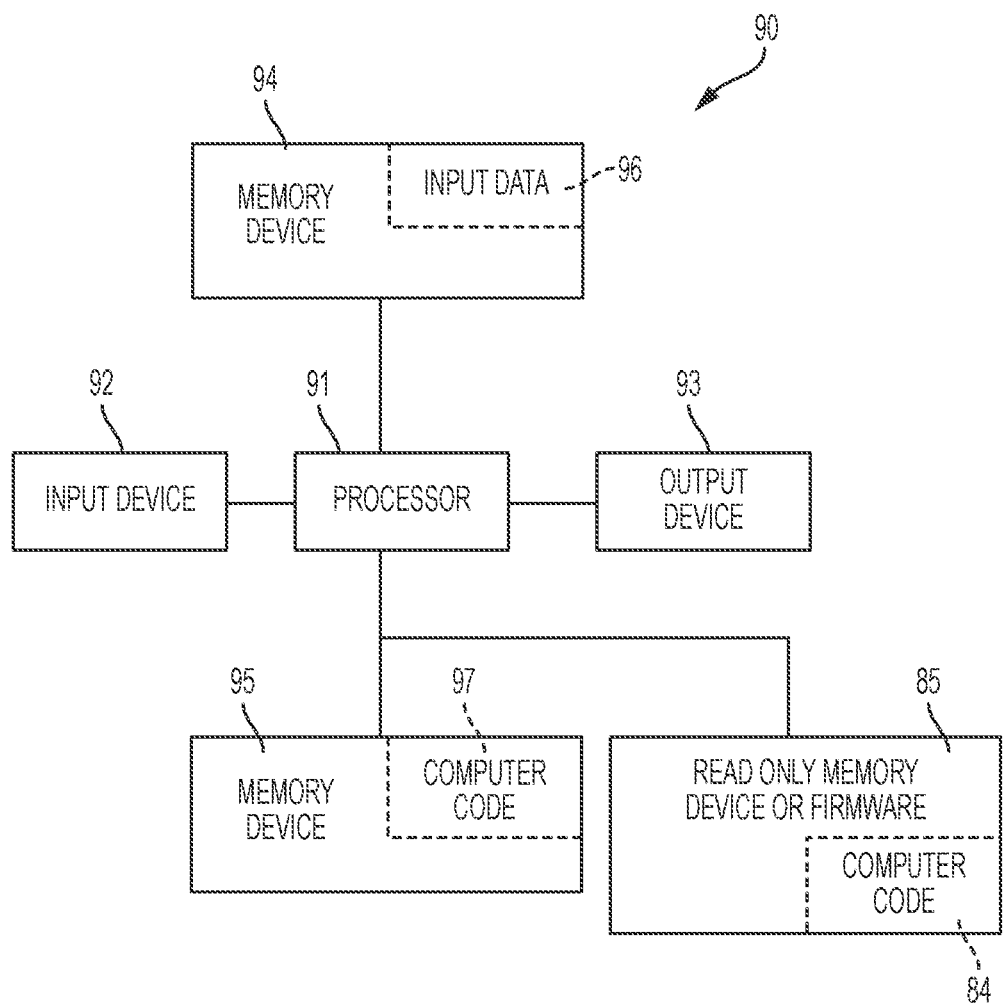
FIG. 4 illustrates a computer system used by the system of FIG. 1 for enabling a process for improving hardware and software based GUI technology associated with presenting location based information for improving an efficiency with respect to hardware device communications, in accordance with embodiments of the present invention.

FIG. 4 illustrates a computer system 90 (e.g., server hardware device 23, local entity systems 49, communication detection systems 49, and hardware devices 14a . . . 14n of FIG. 1) used by or comprised by the system of FIG. 1 improving hardware and software based graphical user interface (GUI) technology associated with presenting location based information for improving an efficiency with respect to hardware device communications, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving hardware and software based graphical user interface (GUI) technology associated with presenting location based information for improving an efficiency with respect to hardware device communications. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve hardware and software based graphical user interface (GUI) technology associated with presenting location based information for improving an efficiency with respect to hardware device communications. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving hardware and software based graphical user interface (GUI) technology associated with presenting location based information for improving an efficiency with respect to hardware device communications. In another embodiment, the invention provides a business method that performs the process steps of the invention on a subscription, advertising, and/or fee basis. That is, a service supplier, such as a Solution Integrator, could offer to enable a process for improving hardware and software based graphical user interface (GUI) technology associated with presenting location based information for improving an efficiency with respect to hardware device communications. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
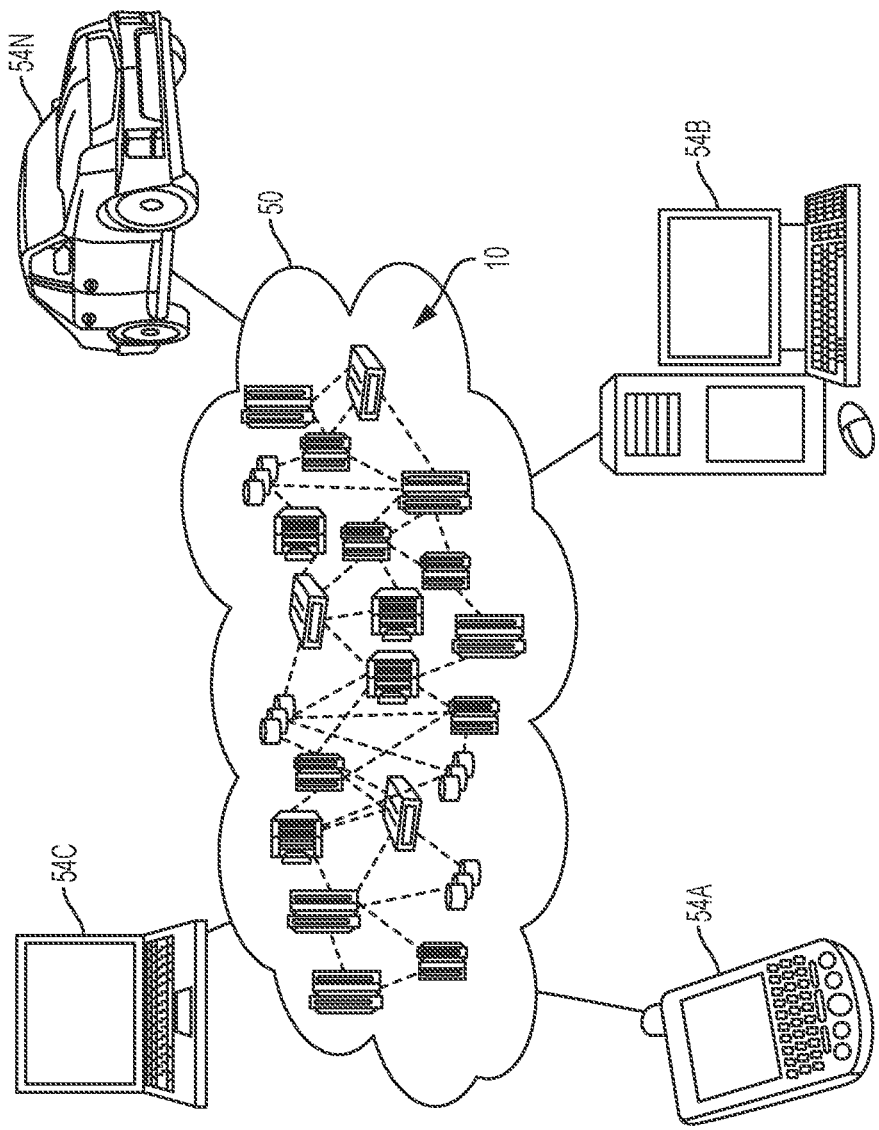
FIG. 5 illustrates a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
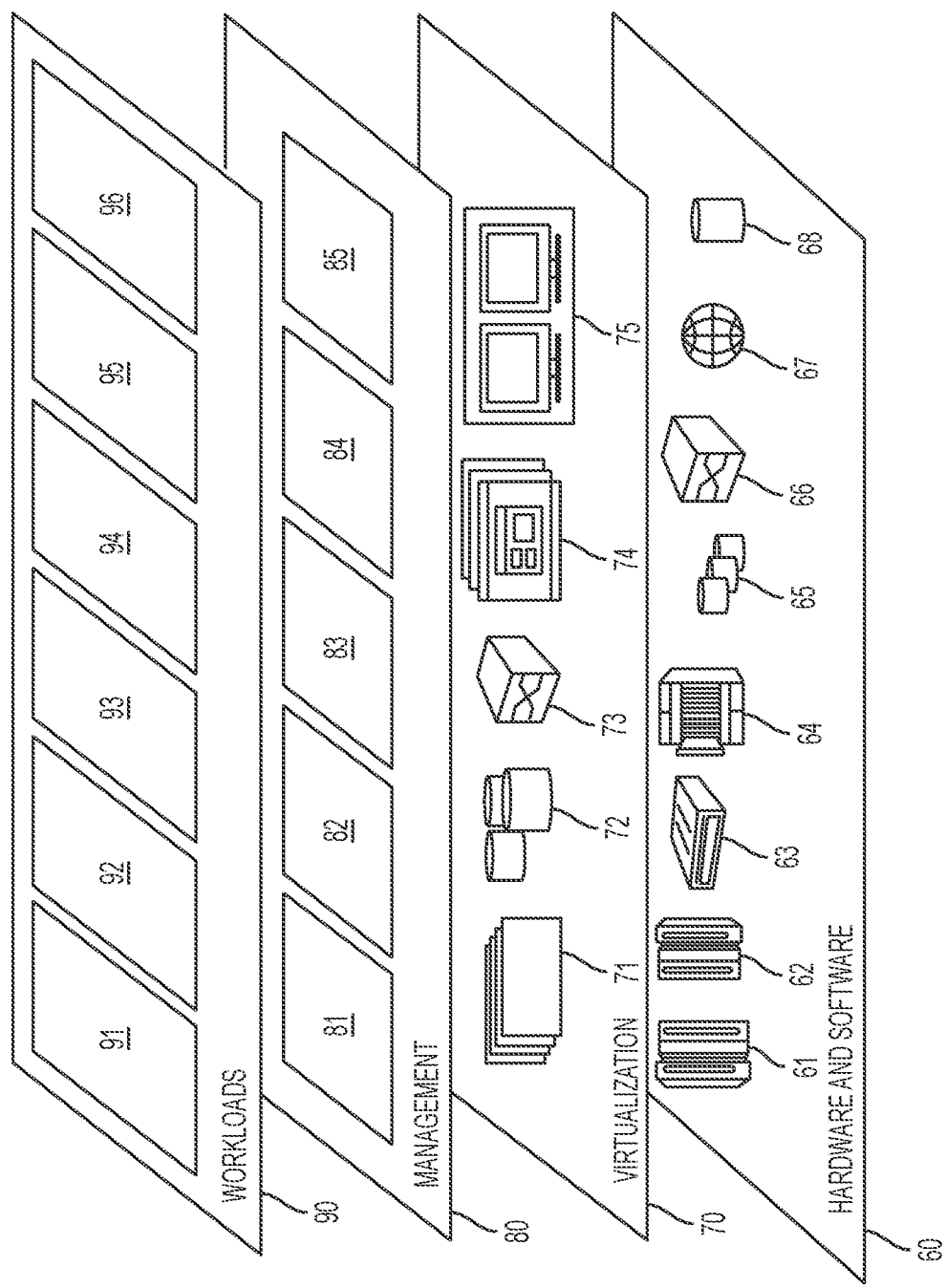
FIG. 6 illustrates a set of functional abstraction layers provided by cloud computing environment, in accordance with embodiments of the present invention.

Referring now to FIG. 6, a set of functional abstraction layers provided by cloud computing environment 50 (see FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving hardware and software based graphical user interface (GUI) technology associated with presenting location based information for improving an efficiency with respect to hardware device communications 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A location detection and presentation improvement method comprising:
receiving from a user of a hardware device, by a processor of a server device, a request for access to a secure Website;
retrieving, by said processor in response to said request, an automated challenge response test for determining that said user is a living being;
detecting, by said processor via a sensor device of said hardware device, a location of said user;
analyzing, by said processor, said location with respect to images of said automated challenge response test;
determining, by said processor based on results of said analyzing, local entities associated with said images;
identifying, by said processor, correct images and incorrect images of said images for executing said automated challenge response test;
first adding, by said processor to said correct images, first actions for enabling said user to execute functions associated with said correct images with respect to said local entities, wherein said adding said first actions comprises generating a graphical user interface (GUI) comprising an instruction GUI portion, a plurality of reservation selection portions associated with said correct images and said local entities, and a verification action execution means;

second adding, by said processor to said incorrect images, and second actions for enabling said user to execute functions associated with said incorrect images actions with respect to said local entities, wherein said first adding in combination with said second adding results in generating a modified automated challenge response test associated with said automated challenge response test;

presenting to said user via said GUI, by said processor, said modified automated challenge response test and an instruction set presented via said instruction GUI portion;

receiving, by said processor, a selection of a group of said images;

receiving from said user via a first reservation selection portion of said plurality of reservation selection portions, by said processor, a reservation selection associated with a first entity of said local entities with respect to an image of said group of images;

receiving from said user via said verification action execution means, by said processor, a verification action execution selection; and executing by said processor in response to said receiving said verification action execution selection, a confirmation of said reservation selection.

2. The method of claim 1, further comprising:
receiving, by said processor from said user, a first selection for at least one action of said first actions or said second actions;
receiving, by said processor, a second selection of an additional group of said images;
first authorizing, by said processor in response to said selection, said first selection, and said second selection, said user for access to said secure Website; and
executing, by said processor in response to said first authorizing, said at least one action.

3. The method of claim 2, further comprising:
receiving, by said processor from said user, a GUI activation experience in response to said first authorizing; and
presenting, by said processor to said user, information associated with said local entities.

4. The method of claim 1, wherein said automated challenge response test comprises a CAPTCHA test.

5. The method of claim 1, wherein said sensor device comprises a device selected from the group consisting of a global positioning satellite (GPS) device, a Bluetooth beaconing device, a cellular telephone detection device, a Wi-Fi positioning detection device, and a triangulation detection device.

6. The method of claim 1, wherein said determining said local entities associated with said images comprises:
querying a database comprising multiple entities associated with multiple subjects and geographical locations; and
selecting said local entities from said database based on results of said querying.

7. The method of claim 1, wherein said first actions differ from said second actions.

8. The method of claim 1, wherein each action of said first actions comprises a first GUI activation means for interacting with first entities of said local entities, and wherein each action of said second actions comprises a second GUI activation means for interacting with second entities of said local entities.

9. The method of claim 1, further comprising:
determining, by said processor, geographical locations associated with recent visits by said user; and
additionally analyzing, by said processor, said geographical locations with respect to said images of said automated challenge response test, wherein said determining said local entities associated with said images is further based on results of said additionally analyzing.

10. The method of claim 1, wherein said local entities comprise entities associated with previous visits of said user.

11. The method of claim 1, further comprising:
providing at least one support service for at least one of creating, integrating, hosting, maintaining, and deploying computer-readable code in the control hardware, said code being executed by the computer processor to implement: said receiving, said retrieving, said detecting, said analyzing, said determining, said identifying, said first adding, said second adding, and said presenting.

12. A computer program product, comprising a computer readable hardware storage device storing a computer readable program code, said computer readable program code comprising an algorithm that when executed by a processor of a server device implements a location detection and presentation improvement method, said method comprising:
receiving from a user of a hardware device, by said processor, a request for access to a secure Website;
retrieving, by said processor in response to said request, an automated challenge response test for determining that said user is a living being;
detecting, by said processor via a sensor device of said hardware device, a location of said user;
analyzing, by said processor, said location with respect to images of said automated challenge response test;
determining, by said processor based on results of said analyzing, local entities associated with said images;
identifying, by said processor, correct images and incorrect images of said images for executing said automated challenge response test;
first adding, by said processor to said correct images, first actions for enabling said user to execute functions associated with said correct images with respect to said local entities, wherein said adding said first actions comprises generating a graphical user interface (GUI) comprising an instruction GUI portion, a plurality of reservation selection portions associated with said correct images and said local entities, and a verification action execution means;
second adding, by said processor to said incorrect images, and second actions for enabling said user to execute functions associated with said incorrect images actions with respect to said local entities, wherein said first adding in combination with said second adding results in generating a modified automated challenge response test associated with said automated challenge response test;
presenting to said user via said GUI, by said processor, said modified automated challenge response test and an instruction set presented via said instruction GUI portion;
receiving, by said processor, a selection of a group of said images;
receiving from said user via a first reservation selection portion of said plurality of reservation selection portions, by said processor, a reservation selection associated with a first entity of said local entities with respect to an image of said group of images;

receiving from said user via said verification action execution means, by said processor, a verification action execution selection; and executing by said processor in response to said receiving said verification action execution selection, a confirmation of said reservation selection.

13. The computer program product of claim 12, wherein said method further comprises:

receiving, by said processor from said user, a first selection for at least one action of said first actions or said second actions;

receiving, by said processor, a second selection of an additional group of said images;

first authorizing, by said processor in response to said selection, said first selection, and said second selection, said user for access to said secure Website; and executing, by said processor in response to said first authorizing, said at least one action.

14. The computer program product of claim 13, wherein said method further comprises:

receiving, by said processor from said user, a GUI activation experience in response to said first authorizing; and presenting, by said processor to said user, information associated with said local entities.

15. The computer program product of claim 12, wherein said automated challenge response test comprises a CAPTCHA test.

16. The computer program product of claim 12, wherein said sensor device comprises a device selected from the group consisting of a global positioning satellite (GPS) device, a Bluetooth beaconing device, a cellular telephone detection device, a Wi-Fi positioning detection device, and a triangulation detection device.

17. The computer program product of claim 12, wherein said determining said local entities associated with said images comprises:

querying a database comprising multiple entities associated with multiple subjects and geographical locations; and selecting said local entities from said database based on results of said querying.

18. The computer program product of claim 12, wherein said first actions differ from said second actions.

19. The computer program product of claim 12, wherein each action of said first actions comprises a first GUI activation means for interacting with first entities of said local entities, and wherein each action of said second actions comprises a second GUI activation means for interacting with second entities of said local entities.

20. A server hardware device comprising a processor coupled to a computer-readable memory unit, said memory unit comprising instructions that when executed by the computer processor implements a location detection and presentation improvement method comprising:

receiving from a user of a hardware device, by said processor, a request for access to a secure Website;

retrieving, by said processor in response to said request, an automated challenge response test for determining that said user is a living being;

detecting, by said processor via a sensor device of said hardware device, a location of said user;

analyzing, by said processor, said location with respect to images of said automated challenge response test;

determining, by said processor based on results of said analyzing, local entities associated with said images;

identifying, by said processor, correct images and incorrect images of said images for executing said automated challenge response test;

first adding, by said processor to said correct images, first actions for enabling said user to execute functions associated with said correct images with respect to said local entities, wherein said adding said first actions comprises generating a graphical user interface (GUI) comprising an instruction GUI portion, a plurality of reservation selection portions associated with said correct images and said local entities, and a verification action execution means;

second adding, by said processor to said incorrect images, and second actions for enabling said user to execute functions associated with said incorrect images actions with respect to said local entities, wherein said first adding in combination with said second adding results in generating a modified automated challenge response test associated with said automated challenge response test;

presenting to said user via said GUI, by said processor, said modified automated challenge response test and an instruction set presented via said instruction GUI portion;

receiving, by said processor, a selection of a group of said images;

receiving from said user via a first reservation selection portion of said plurality of reservation selection portions, by said processor, a reservation selection associated with a first entity of said local entities with respect to an image of said group of images;

receiving from said user via said verification action execution means, by said processor, a verification action execution selection; and executing by said processor in response to said receiving said verification action execution selection, a confirmation of said reservation selection.

* * * * *